M. D. LAWRENCE.
Improvement in Tool for Belt-Riveting.

No. 130,646.

Patented Aug 20, 1872.

Witnesses:
E. Wolff
C. Sedgwick

Inventor:
M. D. Lawrence
Per Munn & Co.
Attorneys.

UNITED STATES PATENT OFFICE.

MORTIMER D. LAWRENCE, OF FLINTVILLE, WISCONSIN.

IMPROVEMENT IN TOOLS FOR BELT-RIVETING.

Specification forming part of Letters Patent No. 130,646, dated August 20, 1872.

Specification describing a new and useful Improvement in Combination Tool for Belt-Riveting, invented by MORTIMER D. LAWRENCE, of Flintville, in the county of Brown and State of Wisconsin.

Figure 1:
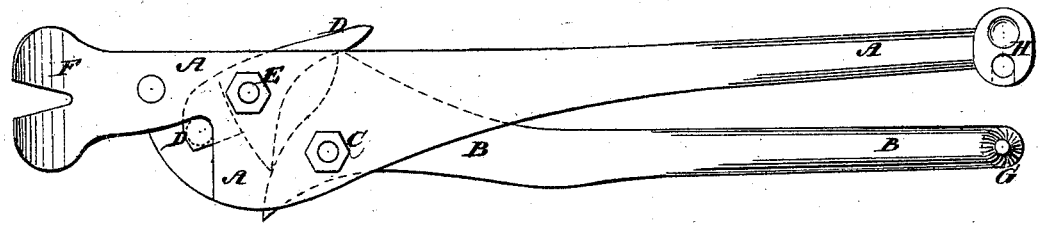
Figure 2:
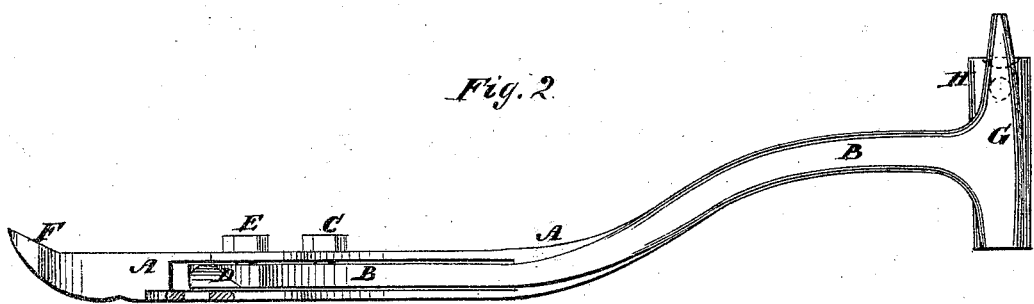

In the accompanying drawing, Figure 1 is a top view of my improved tool. Fig. 2 is a side view of the same, part being broken away to show the construction.

Similar letters of reference indicate corresponding parts.

My invention has for its object to furnish an improved combination tool for use in belt-riveting, which shall be simple in construction, convenient in use, and effective in operation; and it consists in the tool constructed as hereinafter more fully described.

A B are the handles of the tool, the forward part of one of which is made wide, and is slotted, as shown in Figs. 1 and 2, to receive the forward end of the other handle B, where it is pivoted in place by a small bolt or rivet, C. The forward end of the handle B is of the form shown in dotted lines in Fig. 1, to adapt it to operate the cutter D, which is placed in the forward part of the slot in the handle A, where it is pivoted to said handle by a small bolt, E. The cutter D is made in such a form, as shown in dotted lines in Fig. 1, that it may be operated by the movements of the handle B. In the lower plate of the slotted forward part of the handle A is formed a hole to receive the end of the rivet to be cut, the thickness of the said plate being such as to leave the rivet at the proper length for riveting, the tool itself thus serving as a gage. The upper plate of the handle A, above the hole that receives the rivet, is cut away to allow the cut-off pieces of the rivets to drop out freely. Upon the forward end of the handle A is formed a claw, F, for drawing out the old rivets. Upon the rear end of the handle B is formed a punch, G, for forming a hole in the belt. I prefer to make the punch G solid, as it packs the leather about the rivet and thus makes it more firm and secure. Upon the rear end of the other handle A is formed a head, H, in the face of which is formed a hole to receive the end of the rivet to enable the washer to be driven down upon the belt, and a cavity to round up the head of the rivet when desired.

Having thus described my invention, I claim as new and desire to secure by Letters Patent—

An improved combination tool for belt-riveting, consisting of the handles A B, pivoted to each other, and provided with the cutter D, claw F, punch G, head H, substantially as herein shown and described, to adapt the tool to be used, as and for the purposes set forth.

MORTIMER D. LAWRENCE.

Witnesses:
L. R. LAMB, Jr.,
CHAS. F. WALLWITZ.